(12) United States Patent
Guo et al.

(10) Patent No.: US 12,533,529 B2
(45) Date of Patent: Jan. 27, 2026

(54) FLUENCE MAP GENERATION METHOD, TREATMENT PLAN GENERATION METHOD, AND ELECTRONIC DEVICE

(71) Applicants: Our United Corporation, Shaanxi (CN); Shenzhen Our New Medical Technologies Development Co., Ltd., Shenzhen (CN)

(72) Inventors: Xiangyu Guo, Shaanxi (CN); Jinsheng Li, Shaanxi (CN)

(73) Assignees: Our United Corporation, Shaanxi (CN); Shenzhen Our New Medical Technologies Development Co., Ltd., Shenzhen (CN)

( * ) Notice: Subject to any disclaimer, the term of this patent is extended or adjusted under 35 U.S.C. 154(b) by 296 days.

(21) Appl. No.: 18/379,527

(22) Filed: Oct. 12, 2023

(65) Prior Publication Data
US 2025/0001209 A1    Jan. 2, 2025

(30) Foreign Application Priority Data
Jun. 30, 2023 (CN) .......................... 202310800443.8

(51) Int. Cl.
*A61N 5/10* (2006.01)
*A61B 6/00* (2006.01)

(52) U.S. Cl.
CPC .......... *A61N 5/1039* (2013.01); *A61B 6/5282* (2013.01)

(58) Field of Classification Search
CPC .......... A61B 6/00; A61B 6/5282; A61N 5/10; A61N 5/1031; A61N 5/1039; G06N 3/0464; G06N 3/08; G06T 7/0012; G06T 2207/10081; G06T 2207/20081; G06T 2207/20084; G16H 50/50
See application file for complete search history.

(56) References Cited

PUBLICATIONS

Lin Ma, et al. "Deep learning-based inverse mapping for fluence map prediction" Published in final edited form as: Phys Med Biol. ; Phys Med Biol. Author manuscript; available in PMC Feb. 6, 2022.
Xinyi Li, et al. "Insights of an AI agent via analysis of prediction errors: a case study of fluence map prediction for radiation therapy planning" Physics in Medicine & Biology Published Nov. 26, 2021.
Lin Ma, et al. "Generalizability of deep learning-based fluence map prediction as an inverse planning approach" Medical Artificial Intelligence and Automation Laboratory, Department of Radiation Oncology, University of Texas Southwestern Medical Center, 2280 Inwood Rd, Dallas, TX 75390, USA, Publication date Apr. 30, 2021.

*Primary Examiner* — Jurie Yun
(74) *Attorney, Agent, or Firm* — Patterson + Sheridan, LLP (57) ABSTRACT

A fluence map generation method includes: determining radiation information of a target volume at each beam angle of a plurality of beam angles, the target volume including a target area and organs at risk; and inputting the radiation information of the target volume at each beam angle into a fluence map generative model based on a denoising diffusion probabilistic model to obtain a fluence map corresponding to each beam angle. The fluence map corresponding to each beam angle is used to indicate an intensity of each beamlet corresponding to each beam angle in the target volume.

20 Claims, 6 Drawing Sheets

FLUENCE MAP GENERATION METHOD, TREATMENT PLAN GENERATION METHOD, AND ELECTRONIC DEVICE

CROSS-REFERENCE TO RELATED APPLICATION

This application claims priority to Chinese Patent Application No. 202310800443.8, filed on Jun. 30, 2023, which is incorporated herein by reference in its entirety.

TECHNICAL FIELD

The present disclosure relates to the field of computer technologies, and in particular, to a fluence map generation method, a treatment plan generation method, and an electronic device.

BACKGROUND

Currently, the server can input a certain computed tomography (CT) image into a convolutional neural network to predict a fluence map of a certain field angle.

SUMMARY

In a first aspect, a fluence map generation method is provided, which is executed by an electronic device. The fluence map generation method includes: determining radiation information of a target volume at each beam angle of a plurality of beam angles, the target volume including a target area and organs at risk; and inputting the radiation information of the target volume at each beam angle into a fluence map generative model based on a denoising diffusion probabilistic model to obtain a fluence map corresponding to each beam angle. The fluence map corresponding to each beam angle is used to indicate an intensity of each beamlet corresponding to each beam angle in the target volume.

In some embodiments, inputting the radiation information of the target volume at each beam angle into the fluence map generative model based on the denoising diffusion probabilistic model to obtain the fluence map corresponding to each beam angle includes: inputting a dose distribution of the target volume at each beam angle into the fluence map generative model based on the denoising diffusion probabilistic model to obtain the fluence map corresponding to each beam angle, wherein the dose distribution of the target volume at each beam angle is used to indicate a dose of radiation received by the target volume at each beam angle; or inputting an initial fluence map of the target volume at each beam angle into the fluence map generative model based on the denoising diffusion probabilistic model to obtain the fluence map corresponding to each beam angle, wherein the initial fluence map of the target volume at each beam angle of the plurality of beam angles is used to indicate an initial intensity of each beamlet corresponding to each beam angle in the target volume.

In some embodiments, determining the radiation information of the target volume at each beam angle of the plurality of beam angles includes: determining the dose distribution of the target volume at each beam angle of the plurality of beam angles, including: obtaining an image and contour data of the target volume; inputting the image and the contour data of the target volume into a field dose prediction model to obtain a predicted three-dimensional dose distribution of the target volume at each beam angle; and determining the predicted three-dimensional dose distribution of the target volume at each beam angle as the dose distribution of the target volume at each beam angle.

In some embodiments, determining the dose distribution of the target volume at each beam angle of the plurality of beam angles further includes: projecting the predicted three-dimensional dose distribution of the target volume at each beam angle onto a projection plane orthogonal to each beam angle to obtain the dose distribution of the target volume at each beam angle.

In some embodiments, determining the radiation information of the target volume at each beam angle of the plurality of beam angles includes: determining the initial fluence map of the target volume at each beam angle of the plurality of beam angles, including: obtaining an image and contour data of the target volume; and inputting the image and the contour data of the target volume into a neural network model used for fluence map prediction, so as to obtain the initial fluence map of the target volume at each beam angle of the plurality of beam angles.

In some embodiments, the fluence map generative model based on the denoising diffusion probabilistic model includes a first fluence map generative model or a second fluence map generative model. In a case where the fluence map generative model based on the denoising diffusion probabilistic model includes the first fluence map generative model, inputting the radiation information of the target volume at each beam angle into the fluence map generative model based on the denoising diffusion probabilistic model to obtain the fluence map corresponding to each beam angle includes: inputting the radiation information of the target volume at each beam angle into the first fluence map generative model to obtain the fluence map corresponding to each beam angle. In a case where the fluence map generative model based on the denoising diffusion probabilistic model includes the second fluence map generative model, the fluence map generation method further includes: obtaining structural data of the target volume at each beam angle of the plurality of beam angles; and inputting the radiation information of the target volume at each beam angle into the fluence map generative model based on the denoising diffusion probabilistic model to obtain the fluence map corresponding to each beam angle includes: inputting the structural data of the target volume at each beam angle and the radiation information into the second fluence map generative model to obtain the fluence map corresponding to each beam angle.

In a second aspect, a treatment plan generation method is provided, which is executed by an electronic device. The treatment plan generation method includes: obtaining an image and contour data of the target volume, where the target volume includes a target area and organs at risk; determining radiation information of the target volume at each beam angle of a plurality of beam angles according to the image and the contour data of the target volume; inputting the radiation information of the target volume at each beam angle into a fluence map generative model based on a denoising diffusion probabilistic model to obtain a fluence map corresponding to each beam angle, the fluence map corresponding to each beam angle being used to indicate an intensity of each beamlet corresponding to each beam angle in the target volume; and generating a treatment plan according to the fluence map corresponding to each beam angle.

In some embodiments, inputting the radiation information of the target volume at each beam angle into the fluence map generative model based on the denoising diffusion probabilistic model to obtain the fluence map corresponding to each beam angle includes: inputting a dose distribution of the target volume at each beam angle into the fluence map generative model based on the denoising diffusion probabilistic model to obtain the fluence map corresponding to each beam angle, wherein the dose distribution of the target volume at each beam angle is used to indicate a dose of radiation received by the target volume at each beam angle; or inputting an initial fluence map of the target volume at each beam angle into the fluence map generative model based on the denoising diffusion probabilistic model to obtain the fluence map corresponding to each beam angle, wherein the initial fluence map of the target volume at each beam angle of the plurality of beam angles is used to indicate an initial intensity of each beamlet corresponding to each beam angle in the target volume.

In some embodiments, determining the radiation information of the target volume at each beam angle of the plurality of beam angles according to the image and the contour data of the target volume includes: determining the dose distribution of the target volume at each beam angle of the plurality of beam angles according to the image and contour data of the target volume, including: inputting the image and contour data of the target volume into a field dose prediction model to obtain a predicted three-dimensional dose distribution of the target volume at each beam angle; and determining the predicted three-dimensional dose distribution of the target volume at each beam angle as the dose distribution of the target volume at each beam angle.

In some embodiments, determining the dose distribution of the target volume at each beam angle of the plurality of beam angles according to the image and contour data of the target volume further includes: projecting the predicted three-dimensional dose distribution of the target volume at each beam angle onto a projection plane orthogonal to each beam angle to obtain the dose distribution of the target volume at each beam angle.

In some embodiments, determining the radiation information of the target volume at each beam angle of the plurality of beam angles according to the image and the contour data of the target volume includes: determining the initial fluence map of the target volume at each beam angle of the plurality of beam angles according to the image and contour data of the target volume, including: inputting the image and the contour data of the target volume into a neural network model used for fluence map prediction to obtain the initial fluence map of the target volume at each beam angle of the plurality of beam angles.

In some embodiments, the fluence map generative model based on the denoising diffusion probabilistic model includes a first fluence map generative model or a second fluence map generative model. In a case where the fluence map generative model based on the denoising diffusion probabilistic model includes the first fluence map generative model, inputting the radiation information of the target volume at each beam angle into the fluence map generative model based on the denoising diffusion probabilistic model to obtain the fluence map corresponding to each beam angle includes: inputting the radiation information of the target volume at each beam angle into the first fluence map generative model to obtain the fluence map corresponding to each beam angle. In a case where the fluence map generative model based on the denoising diffusion probabilistic model includes the second fluence map generative model, the fluence map generation method further includes obtaining structural data of the target volume at each beam angle of the plurality of beam angles; and inputting the radiation information of the target volume at each beam angle into the fluence map generative model based on the denoising diffusion probabilistic model to obtain the fluence map corresponding to each beam angle includes: inputting the structural data of the target volume at each beam angle and the radiation information into the second fluence map generative model to obtain the fluence map corresponding to each beam angle.

In a third aspect, an electronic device is provided, which includes: a processor and a memory configured to store instructions executable by the processor. The processor is configured to execute the instructions to cause the electronic device to implement the fluence map generation method in any of the above embodiments in the first aspect, or to implement the treatment plan generation method in any of the above embodiments in the second aspect.

In a fourth aspect, a non-transitory computer-readable storage medium is provided. The non-transitory computer-readable storage medium has stored instructions. The instructions in the non-transitory computer-readable storage medium, when executed by an electronic device, cause the electronic device to execute the fluence map generation method in any of the above embodiments in the first aspect, or to execute the treatment plan generation method in any of the above embodiments in the second aspect.

In a fifth aspect, a computer program product is provided. The computer program product includes computer instructions carried on a non-transitory computer-readable storage medium. The computer instructions, when run on an electronic device, cause the electronic device to execute the fluence map generation method in any of the above embodiments in the first aspect, or to execute the treatment plan generation method in any of the above embodiments in the second aspect.

BRIEF DESCRIPTION OF THE DRAWINGS

In order to describe technical solutions in some embodiments of the present disclosure more clearly, the accompanying drawings to be used in some embodiments of the present disclosure will be introduced briefly. However, the accompanying drawings to be described below are merely accompanying drawings of some embodiments of the present disclosure, and a person having ordinary skill in the art may obtain other drawings according to these drawings. In addition, the accompanying drawings in the following description may be regarded as schematic diagrams, and are not limitations to actual sizes of products, actual processes of methods or actual timings of signals involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person having ordinary skill in the art based on the embodiments of the present disclosure shall be included in the protection scope of the present disclosure.

Hereinafter, the terms such as "first", "second", etc. are used to distinguish different objects rather than to describe a specific order of the objects. The terms such as "first" and "second" are only used for descriptive purposes, and are not to be construed as indicating or implying the relative importance or implicitly indicating the number of indicated technical features. Thus, features defined with "first" and "second" may explicitly or implicitly include one or more of the features.

Furthermore, the terms "comprising/including" and "having" and any derivations thereof mentioned in the embodiments of the present disclosure are intended to cover non-exclusive inclusion. For example, a process, method, system, product or device that includes a series of steps or modules is not limited to the listed steps or modules, but optionally also includes other unlisted steps or modules, or optionally also includes other steps or modules inherent to the process, method, product or device.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

It should be noted that in the embodiments of the present disclosure, a term such as "exemplary" or "for example" is used to represent an example, illustration or introduction. Any embodiment or design described as "exemplary" or "for example" in the embodiments of the present disclosure is not intended to be construed as preferred or advantageous over other embodiments or designs. In addition, use of the term "exemplary" or "for example" is intended to present related concepts by way of example.

The phrase "A and/or B" mentioned in the embodiments of the present disclosure includes a case of using any one of A and B or using A and B at the same time. The phrase "A and/or B" includes the following three combinations: only A, only B, and a combination of A and B.

In the description of the embodiments of the present disclosure, term "a plurality of" or "the plurality of" means two or more unless otherwise specified.

As used herein, depending on the context, the term "if" is optionally construed to mean "when", "in a case where", "in response to determining" or "in response to detecting". Similarly, depending on the context, the phrase "if it is determined that" or "if [a stated condition or event] is detected" is optionally construed as "in a case where it is determined that", "in response to determining that", "in a case where [the stated condition or event] is detected" or "in response to detecting [the stated condition or event]".

The phase "applicable to" or "configured to" used herein means an open and inclusive expression, which does not exclude devices that are applicable to or configured to perform additional tasks or steps.

In addition, the phrase "based on" used is meant to be open and inclusive, since processes, steps, calculations or other actions "based on" one or more of the stated conditions or values may, in practice, be based on additional conditions or values exceeding those stated.

Some of the concepts involved in a fluence map generation method, a treatment plan generation method, and an electronic device provided in the embodiments of the present disclosure will be explained below.

Radiation therapy, one of the important methods of tumor treatment, is used to eliminate tumors by giving them a sufficiently high lethal dose of radiation. Since radiation cannot distinguish between tumor cells and normal tissues, when high doses are given to tumors, normal tissues will also be irradiated to varying degrees by radiation. In clinical practice, treatment plans with modulated radiation field intensity distribution are usually used to satisfy the goal of giving high doses to the tumors without overdosing the normal tissues.

Intensity-modulated therapy is a commonly technology used in tumor radiotherapy. Intensity-modulated therapy plans require planners to continuously adjust dose-volume constraint goals and corresponding weights to achieve clinically required dose distribution. In order to obtain good dosimetry goals, the planners need excellent plan design skills and more optimization time to achieve the desired goals, and the plan quality largely depends on the planners' experience and plan optimization time.

Currently, a computed tomography (CT) image may be input into a convolutional neural network to predict a fluence map at a certain beam angle. However, the convolutional neural network lacks understanding of the detailed information of the CT image (such as the gradient of the CT image). The fluence map predicted by the CT image input into the convolutional neural network is too smooth and is greatly different from the fluence map of the real image.

In light of this, some embodiments of the present disclosure provide a fluence map generation method, a treatment plan generation method, and an electronic device. Since a denoising diffusion probabilistic model is a deep learning model based on likelihood estimation, high quality images can be generated based on the denoising diffusion probabilistic model. In this way, the electronic device inputs the radiation information of the target volume at each beam angle into a fluence map generative model (e.g., a first fluence map generative model) based on the denoising diffusion probabilistic model, and a high-quality fluence map corresponding to each beam angle is generated, thus improving the validity of fluence map generation.

Figure 1:
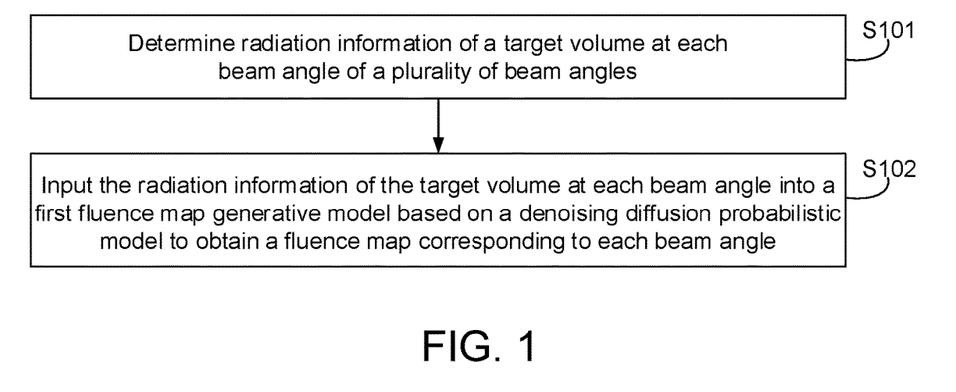
FIG. 1 is a schematic flow diagram of a fluence map generation method, in accordance with some embodiments of the present disclosure.

As shown in FIG. 1, some embodiments of the present disclosure provide a fluence map generation method, which is executed by an electronic device, and the fluence map generation method may include as follows.

In S101, radiation information of a target volume at each beam angle of a plurality beam angles is determined.

The target volume includes a target area and organs at risk.

In some examples, the radiation information of the target volume at each beam angle of the plurality of beam angles includes a dose distribution or an initial fluence map. It can be understood that the dose distribution of the target volume at each beam angle may indicate a dose of radiation received by the target volume at each beam angle, and the initial fluence map of the target volume at each beam angle may indicate an initial intensity of each beamlet corresponding to each beam angle in the target volume.

In some examples, a beam angle may also be understood as a beam direction.

For example, the electronic device may equally divide 360° according to a preset angle (such as 40° or) 45° to obtain the plurality of beam angles; or the electronic device may arbitrarily set some angles (such as 20° and) 80° as the plurality of beam angles.

It should be noted that a form of the dose distribution in the embodiments of the present disclosure may be image information of the dose distribution, such as a dose distribution image. The solutions of the present disclosure will be described below by taking the dose distribution image as an example. Another form of the dose distribution may be parameter information (or data information) of the dose distribution, such as a text or code that may indicate the dose distribution. The embodiments of the present disclosure do not specifically limit the form of the dose distribution.

Next, the electronic device inputs the radiation information of the target volume at each beam angle into a fluence map generative model based on the denoising diffusion probabilistic model to obtain the fluence map corresponding to each beam angle.

In some examples, the fluence map generative model based on the denoising diffusion probabilistic model includes a first fluence map generative model. In this case, inputting the radiation information of the target volume at each beam angle into the fluence map generative model based on the denoising diffusion probabilistic model to obtain the fluence map corresponding to each beam angle includes S102. In S102, the radiation information of the target volume at each beam angle is input into the first fluence map generative model based on the denoising diffusion probabilistic model to obtain the fluence map corresponding to each beam angle.

The fluence map corresponding to each beam angle is used to indicate the intensity of each beamlet in the target volume corresponding to each beam angle.

In an optional implementation, when the radiation information includes the dose distribution, the first fluence map generative model may be trained using dose distributions as training samples. In this case, the input of the first fluence map generative model is the dose distribution of the target volume at each beam angle. That is, the electronic device inputs the dose distribution of the target volume at each beam angle into the first fluence map generative model to obtain the fluence map corresponding to each beam angle.

In another optional implementation, when the radiation information includes the initial fluence map, the first fluence map generative model may be trained using fluence maps as training samples. In this case, the input of the first fluence map generative model is the initial fluence map of the target volume at each beam angle. That is, the electronic device may input the initial fluence map of the target volume at each beam angle into the first fluence map generative model to obtain the fluence map corresponding to each beam angle.

It can be understood that the denoising diffusion probabilistic model is a deep learning model based on likelihood estimation. The electronic device inputs the dose distribution or the initial fluence map of the target volume at each beam angle into the first fluence map generative model based on the denoising diffusion probabilistic model, so that a high quality image is generated. That is, the obtained fluence map corresponding to each beam angle is a high quality fluence map.

It is worth noting that based on the denoising diffusion probabilistic theory, the embodiments of the present disclosure may decompose the fluence map generation task (or prediction task) into a forward noise diffusion process and a reverse denoising process. In the forward noise diffusion phase, the dose distribution image or initial fluence map gradually adds Gaussian noise during a time period; and in the reverse denoising process, the dose distribution image or initial fluence map is gradually restored to obtain a high quality fluence map.

The technical solutions provided in the embodiments can bring at least beneficial effects as follows. From the above description, it can be seen that, the electronic device may first determine the radiation information (for example, including the dose distribution or the initial fluence map) of the target volume at each beam angle of the plurality of beam angles. Then, the electronic device may obtain the fluence map corresponding to each beam angle, for example, by inputting the radiation information (e.g., the dose distribution or the initial fluence map) of the target volume at each beam angle into the fluence map generative model based on the denoising diffusion probabilistic model (e.g., the first fluence map generative model), and the fluence map corresponding to each beam angle is used to indicate the intensity of each beamlet corresponding to each beam angle in the target volume. In the embodiments of the present disclosure, since the denoising diffusion probabilistic model is a deep learning model based on likelihood estimation, higher quality images can be generated based on the denoising diffusion probabilistic model. In this way, the electronic device inputs the dose distribution or initial fluence map of the target volume at each beam angle into the fluence map generative model based on the denoising diffusion probabilistic model, and the high-quality fluence map corresponding to each beam angle may be generated, thus improving the validity of the fluence map generation.

Figure 2:
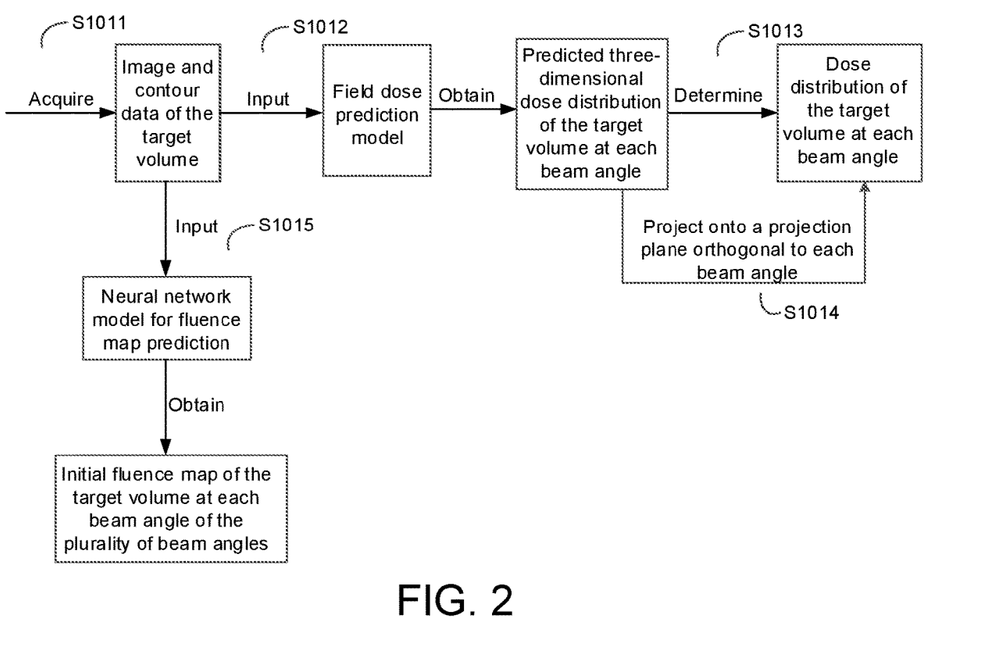
FIG. 2 is a schematic diagram showing a process of determining a dose distribution and an initial fluence map, in accordance with some embodiments of the present disclosure.

As shown in FIG. 2, in an implementation of the embodiments of the present disclosure, the radiation information includes the dose distribution, and determining, by the electronic device, the radiation information, i.e., the dose distribution, of the target volume at each beam angle of the plurality of beam angles may include S1011 to S1013.

In S1011, an image and contour data of the target volume are acquired.

In an optional implementation, the image of the target volume may be a CT image, magnetic resonance imaging (MRI) image, or positron emission tomography (PET) image of a certain patient. After the CT image, MRI image, or PET image is imported into the treatment planning system (TPS), and outline the target area and organs at risk of the patient, and the target volume may be determined.

It can be understood that the CT image, MRI image, or PET image may also be imported into the contour delineation system, and the target area and organs at risk of the patient may be delineated to determine the target volume.

It is worth noting that the contour data includes the contours of the target area and the contours of the organs at risk. The contours of the target area may indicate the position of the target area in the target volume. The contours of the organs at risk may indicate the positions of the organs at risk in the target volume.

In S1012, the image and the contour data of the target volume are input into a field dose prediction model to obtain a predicted three-dimensional dose distribution of the target volume at each beam angle.

It can be understood that the field dose prediction model is a pre-trained neural network model used to predict a three-dimensional dose distribution of a volume (e.g., the target volume) at each beam angle.

In S1013, the predicted three-dimensional dose distribution of the target volume at each beam angle is determined as the dose distribution of the target volume at each beam angle.

It is worth noting that the predicted three-dimensional dose distribution of the target volume at each beam angle predicted by the electronic device based on the field dose prediction model is the three-dimensional spatial dose of the target volume at each beam angle, and the three-dimensional spatial dose at each beam angle may indicate the spatial information of the dose of the target volume at each beam angle. In the embodiments of the present disclosure, the electronic device inputs the image and the contour data of the target volume into the field dose prediction model, so that the three-dimensional dose distribution (or three-dimensional spatial dose) of the target volume at each beam angle can be predicted accurately and effectively. That is, the spatial information that can indicate the dose of the target volume at each beam angle can be obtained. In addition, there is a corresponding relationship between the dose distribution of the target volume determined by the electronic device at each beam angle and the fluence map corresponding to each beam angle; therefore, the fluence map corresponding to each beam angle can be determined accurately and effectively based on the three-dimensional dose distribution (or three-dimensional spatial dose) of the target volume at each beam angle.

As shown in FIG. 2, determining, by the electronic device provided in some embodiments of the present disclosure, the dose distribution of the target volume at each beam angle of the plurality of beam angles may further include S1014.

In S1014, the predicted three-dimensional dose distribution of the target volume at each beam angle is projected onto a projection plane orthogonal to each beam angle, so as to obtain the dose distribution of the target volume at each beam angle.

It can be understood that the electronic device may determine the projection plane orthogonal to each beam angle firstly. Then, the electronic device may use ray tracing algorithm to project the predicted three-dimensional dose distribution (or three-dimensional spatial dose) of the target volume at each beam angle onto the projection plane orthogonal to each beam angle, so that a two-dimensional dose projection of the target volume at each beam angle can be obtained.

In the embodiments of the present disclosure, the electronic device may compress the three-dimensional dose distribution (or three-dimensional spatial dose) used to indicate the spatial information of the dose of the target volume at each beam angle into a form that can indicate the two-dimensional dose projection of the two-dimensional structure of the target volume at each beam angle. That is, the two-dimensional dose projection of the target volume at each beam angle can accurately and effectively reflect the amount of radiation that the target volume (including the target area and organs at risk) can receive. In this way, the electronic device determines the two-dimensional dose projection of the target volume at each beam angle as the dose distribution of the target volume at each beam angle, and may accurately and effectively determine the fluence map corresponding to each beam angle.

In another implementation of the embodiments of the present disclosure, the radiation information includes the initial fluence map, and as shown in FIG. 2, determining, by the electronic device, the radiation information, i.e., the initial fluence map, of the target volume at each beam angle of the plurality of beam angles includes S1011 and S1015.

In S1011, an image and contour data of the target volume are acquired.

It should be noted that S1011 has been explained in the above embodiments and will not be repeated here.

In S1015, the image and the contour data of the target volume are input into a neural network model used for fluence map prediction, so as to obtain the initial fluence map of the target volume at each beam angle of the plurality of beam angles.

It is worth noting that the neural network model is used to predict an initial fluence map of a volume (e.g., the target volume) at each beam angle. The neural network model can be understood as a trained network model with a high prediction accuracy (or precision).

In some examples, the electronic device may train a network model with low accuracy (or precision) in an initial state based on images of a plurality of volumes, contour data of the plurality of volumes, and fluence maps of the plurality of volumes at each beam angle, so as to obtain the above-mentioned neural network model for fluence map prediction.

For example, the neural network model may be a convolutional neural network (CNN).

In the embodiments of the present disclosure, after acquiring the image and the contour data of the target volume, the electronic device inputs the image and the contour data of the target volume into the neural network model used for fluence map prediction, so that the initial fluence map of the target volume at each beam angle of the plurality of beam angles may be obtained conveniently and quickly, and the generation rate of the fluence map corresponding to each beam angle may be increased.

Figure 3:
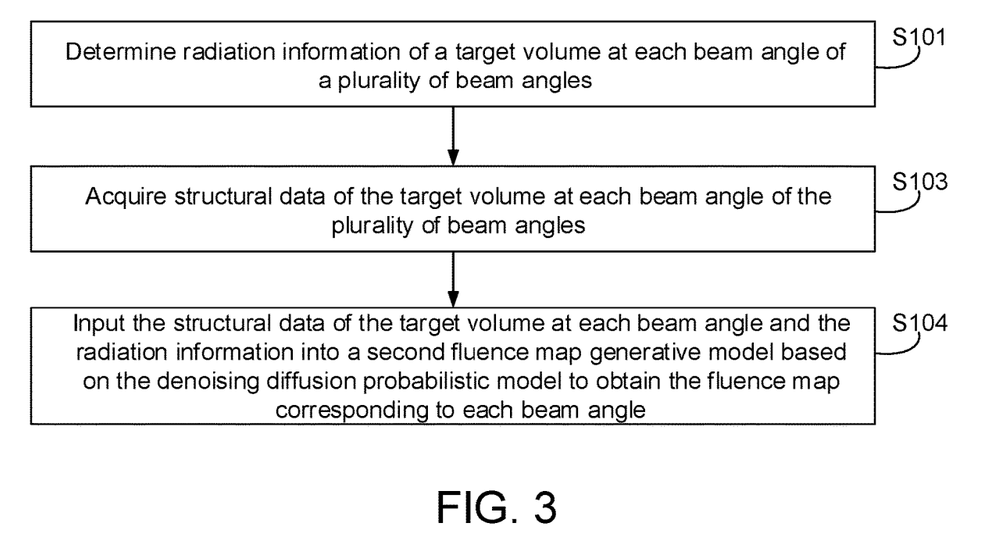
FIG. 3 is a schematic flow diagram of another fluence map generation method, in accordance with some embodiments of the present disclosure.

In some embodiments, as shown in FIG. 3, the fluence map generation method provided in the embodiments of the present disclosure may further include S103.

In S103, structural data of the target volume at each beam angle of the plurality of beam angles is acquired.

The structural data is used to indicate histomorphology of the target area and the organs at risk included in the target volume.

In some examples, the fluence map generative model based on the denoising diffusion probabilistic model includes a second fluence map generative model. In this case, inputting the radiation information of the target volume at each beam angle into the fluence map generative model based on the denoising diffusion probabilistic model to obtain the fluence map corresponding to each beam angle includes S104. In S104, the structural data of the target volume at each beam angle and the radiation information are input into the second fluence map generative model based on the denoising diffusion probabilistic model to obtain the fluence map corresponding to each beam angle.

In some examples, the radiation information includes the dose distribution or the initial fluence map. For example, the electronic device may input the structural data of the target volume at each beam angle and the dose distribution of the target volume at each beam angle into the second fluence map generative model to obtain the fluence map corresponding to each beam angle. Alternatively, the electronic device may input the structural data of the target volume at each beam angle and the initial fluence map of the target volume at each beam angle into the second fluence map generative model to obtain the fluence map corresponding to each beam angle.

It can be understood that the second fluence map generative model may be trained using structural data and radiation information as training samples. In this case, the input of the second fluence map generative model is the structural data of the target volume at each beam angle and the radiation information of the target volume at each beam angle. For example, the second fluence map generative model may be trained using structural data and dose distributions as training samples. In this case, the input of the second fluence map generative model is the structural data of the target volume at each beam angle and the dose distribution of the target volume at each beam angle. Alternatively, the second fluence map generative model may be trained using the structural data and initial fluence maps as training samples. In this case, the input of the second fluence map generative model is the structural data of the target volume at each beam angle and the initial fluence map of the target volume at each beam angle.

In the embodiments of the present disclosure, the structural data of the target volume at each beam angle may indicate the histomorphology of the target area and organs at risk included in the target volume. In this way, the electronic device inputs the structural data of the target volume at each beam angle and the radiation information (dose distribution or initial fluence map) of the target volume at each beam angle into the second fluence map generative model that is based on the denoising diffusion probabilistic model, so that the fluence map with image quality comparable to the image quality of the real fluence map may be obtained, which can improve the validity of the fluence map.

In the embodiments of the present disclosure, after the electronic device obtains (or acquires) the fluence map corresponding to each beam angle, the electronic device may generate a treatment plan based on the fluence map corresponding to each beam angle.

Figure 4:
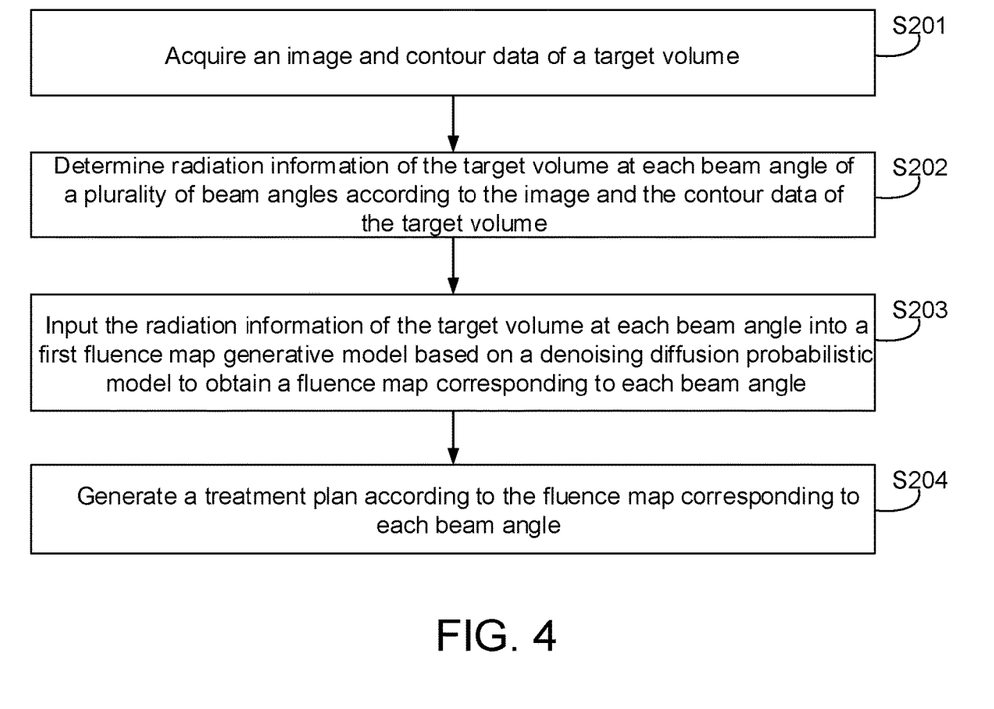
FIG. 4 is a schematic flow diagram of a treatment plan generation method, in accordance with some embodiments of the present disclosure.

Based on this, some embodiments of the present disclosure further provide a treatment plan generation method. The treatment plan generation method can be performed by an electronic device. As shown in FIG. 4, the treatment plan generation method provided in the embodiments of the present disclosure may include S201 to S204.

In S201, an image and contour data of a target volume are acquired.

The target volume includes a target area and an organ at risk.

In S202, radiation information of the target volume at each beam angle of a plurality of beam angles is determined based on the image and the contour data of the target volume.

Then, the electronic device inputs the radiation information of the target volume at each beam angle into a fluence map generative model based on the denoising diffusion probabilistic model to obtain the fluence map corresponding to each beam angle.

In some examples, the fluence map generative model based on the denoising diffusion probabilistic model includes a first fluence map generative model. In this case, inputting the radiation information of the target volume at each beam angle into the fluence map generative model based on the denoising diffusion probabilistic model to obtain the fluence map corresponding to each beam angle includes S203. In S203, the radiation information of the target volume at each beam angle is input into the first fluence map generative model based on the denoising diffusion probabilistic model to obtain the fluence map corresponding to each beam angle.

The fluence map corresponding to each beam angle is used to indicate the intensity of each beamlet corresponding to each beam angle in the target volume.

It should be noted that the explanations of S201 and S203 are respectively the same or similar to the descriptions of the above S1011 and S102, and details will not be repeated here.

In S204, a treatment plan according to the fluence map corresponding to each beam angle is generated.

In some examples, the radiation information includes a dose distribution or an initial fluence map.

It can be understood that the treatment plan may include position information (or coordinates) of leaves of the multileaf collimator, the number of monitor units in each segment at each moment, and the weight corresponding to the number of the monitor units in each segment at each moment.

It can be understood that the number of monitor units in each segment at each moment is determined according to the product of the weight corresponding to the number of monitor units in each segment at each moment and the prescription dose. The prescription dose is a dose predetermined by the doctor that the target volume should receive.

In an optional implementation, the electronic device may further evaluate the treatment plan after generating the treatment plan. For example, the electronic device may generate relevant dose distribution and/or dose and volume histogram (DVH) based on treatment plan information. Then, the electronic device determines whether the dose reflected by the dose distribution and/or DVH is within a limited range, which may also be understood as determining whether the dose reflected by the dose distribution and/or DVH satisfies the clinical standard. After the treatment plan is evaluated as qualified, the electronic device outputs the treatment plan, and the radiotherapy device executes the treatment plan.

The technical solutions provided by the above embodiments can bring at least the beneficial effects as follows. It can be known from S201 to S204 that, the electronic device may obtain the image and the contour data of the target volume, and determine the radiation information (for example, including the dose distribution or the initial fluence map) of the target volume at each beam angle of the plurality of beam angles according to the image and the contour data of the target volume. Next, the electronic device may input the radiation information (e.g., the dose distribution or the initial fluence map) of the target volume at each beam angle into the fluence map generative model (e.g., the first fluence map generative model) based on the denoising diffusion probabilistic model to obtain the fluence map corresponding to each beam angle. Then, the electronic device may generate the treatment plan according to the fluence map corresponding to each beam angle.

In the embodiments of the present disclosure, since the denoising diffusion probabilistic model is a deep learning model based on likelihood estimation, high quality images can be generated based on the denoising diffusion probabilistic model. In this way, the electronic device inputs the dose distribution or initial fluence map of the target volume at each beam angle into the fluence map generative model based on the denoising diffusion probabilistic model, so that the high quality fluence image corresponding to each beam angle may be generated. Then, the electronic device can generate the real and effective treatment plan according to the fluence map corresponding to each beam angle.

In some embodiments, the radiation information includes the dose distribution or the initial fluence map.

In some examples, the dose distribution of the target volume at each beam angle may be input into the first fluence map generative model based on a denoising diffusion probabilistic model to obtain the fluence map corresponding to each beam angle. The dose distribution of the target volume at each beam angle is used to indicate the dose of radiation received by the target volume at each beam angle.

In some other examples, the initial fluence map of the target volume at each beam angle may be input into the first fluence map generative model based on the denoising diffusion probabilistic model to obtain the fluence map corresponding to each beam angle. The initial fluence map of the target volume at each beam angle of the plurality of beam angles is used to indicate the initial intensity of each beamlet corresponding to each beam angle in the target volume.

Figure 5:
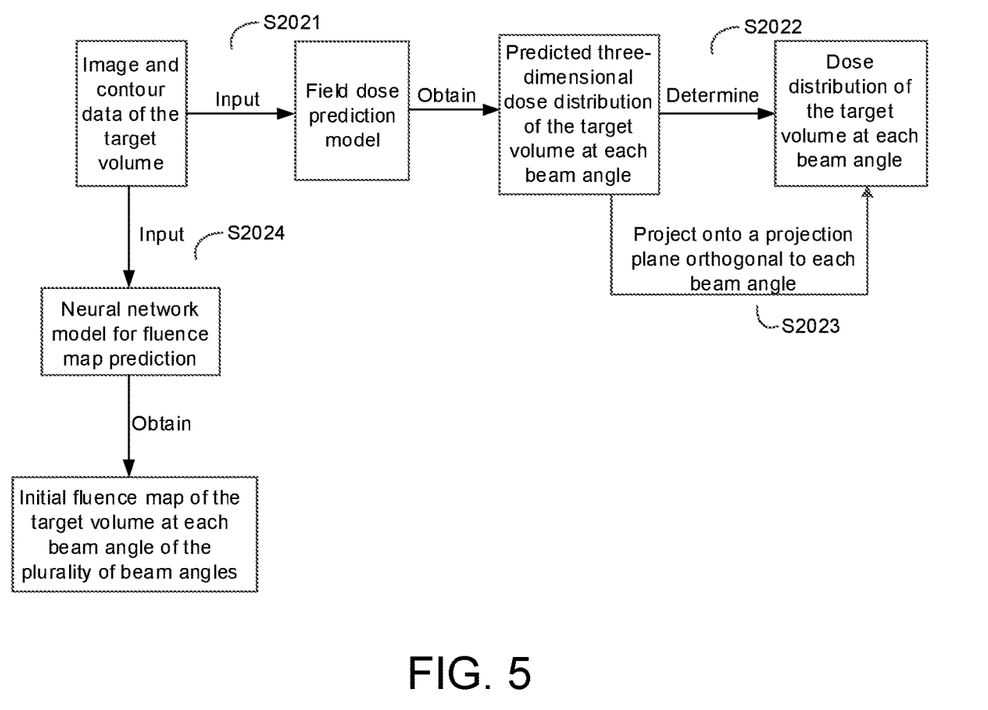
FIG. 5 is a schematic diagram showing another process of determining a dose distribution and an initial fluence map, in accordance with some embodiments of the present disclosure.

In some embodiments, as shown in FIG. 5, determining, by the electronic device, the dose distribution of the target volume at each beam angle of the plurality of beam angles according to the image and the contour data of the target volume may include S2021 to S2023.

In S2021, the image and the contour data of the target volume are input into a field dose prediction model to obtain a predicted three-dimensional dose distribution of the target volume at each beam angle.

In S2022, the predicted three-dimensional dose distribution of the target volume at each beam angle is determined as the dose distribution of the target volume at each beam angle.

It should be noted that the explanations of S2021 and S2022 are respectively the same or similar to the descriptions of the above S1012 and S1013, and details will not be repeated here.

In the embodiments of the present disclosure, a target characteristic of the target volume may indicate a pixel value of each pixel point included in the target volume and the positional relationship between the target area and the organs at risk included in the target volume. In this way, the electronic device inputs the target characteristics of the target volume into the field dose prediction model, and the three-dimensional dose distribution (or three-dimensional spatial dose) of the target volume at each bean angle can be accurately and effectively predicted. That is, the spatial information that can indicate the dose of the target volume at each beam angle may be obtained. In addition, there is a corresponding relationship between the dose distribution of the target volume determined by the electronic device at each beam angle and the fluence map corresponding to each beam angle; therefore, the fluence map corresponding to each beam angle can be determined accurately and effectively based on the three-dimensional dose distribution (or three-dimensional spatial dose) of the target volume at each beam angle.

In S2023, the predicted three-dimensional dose distribution of the target volume at each beam angle is projected onto a projection plane orthogonal to each beam angle, so as to obtain the dose distribution of the target volume at each beam angle.

It should be noted that the explanation of S2023 is the same or similar to the description of the above S1014, and details will not be repeated here.

In the embodiments of the present disclosure, the electronic device may compress the three-dimensional dose distribution (or the three-dimensional spatial dose) used to indicate the three-dimensional spatial information of the target volume at each beam angle into a two-dimensional dose projection that can indicate the two-dimensional structure of the target volume at each beam angle. That is, the two-dimensional dose projection of the target volume at each beam angle can accurately and effectively reflect the amount of radiation that the target volume (including target area and organs at risk) can receive. In this way, the electronic device determines the two-dimensional dose projection of the target volume at each beam angle as the dose distribution of the target volume at each beam angle, and may accurately and effectively determine the fluence map corresponding to each beam angle.

In some embodiments, as shown in FIG. 5, determining, by the electronic device, the initial fluence map of the target volume at each beam angle of the plurality of beam angles according to the image and the contour data of the target volume may include S2024.

In S2024, the electronic device inputs the image and the contour data of the target volume into a neural network model used for fluence map prediction, so as to obtain the initial fluence map of the target volume at each beam angle of the plurality of beam angles.

It should be noted that the explanation of S2024 is the same or similar to the description of the above S1015, and details will not be repeated here.

In the embodiments of the present disclosure, after the electronic device acquires the image and the contour data of the target volume, the image and the contour data of the target volume are input into the neural network model used for fluence map prediction, so that the initial fluence map of the target volume at each beam angle of the plurality of beam angles may be obtained conveniently and quickly, and the generation rate of the fluence map corresponding to each beam angle may be increased.

Figure 6:
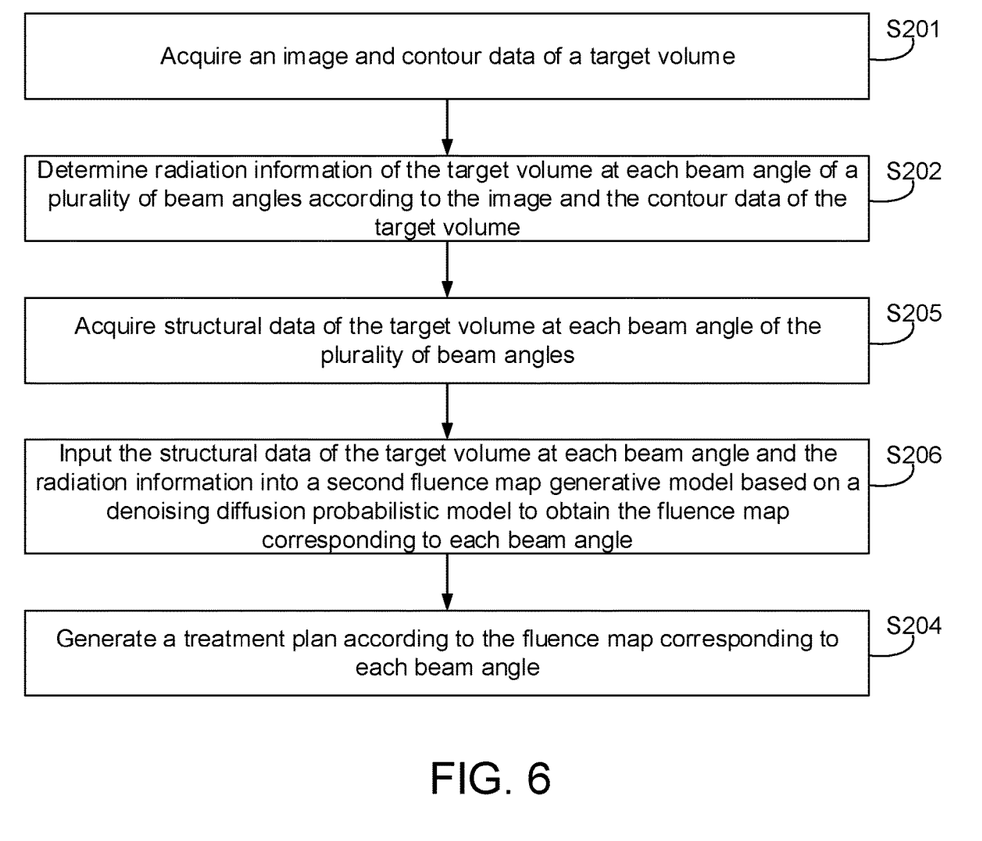
FIG. 6 is a schematic flow diagram of another treatment plan generation method, in accordance with some embodiments of the present disclosure.

In some embodiments, in conjunction with FIG. 4, as shown in FIG. 6, the treatment plan generation method provided in the embodiments of the present disclosure may further include S205.

In S205, structural data of the target volume at each beam angle of the plurality of beam angles is acquired.

In combination with the description of the above embodiments, it can be understood that the structural data is used to indicate the tissue morphology of the target area and the organs at risk included in the target volume.

In some examples, the fluence map generative model based on the denoising diffusion probabilistic model includes a second fluence map generative model. In this case, inputting the radiation information of the target volume at each beam angle into the fluence map generative model based on the denoising diffusion probabilistic model to obtain the fluence map corresponding to each beam angle includes S206. In S206, the electronic device inputs the structural data of the target volume at each beam angle and the radiation information (e.g., the dose distribution or the initial fluence map) into the second fluence map generative model based on the denoising diffusion probabilistic model to obtain the fluence map corresponding to each beam angle.

It should be noted that the explanations of S205 and S206 are respectively the same or similar to the descriptions of S103 and S104, and details will not be repeated here.

In the embodiments of the present disclosure, the structural data of the target volume at each beam angle may indicate the tissue morphology of the target area and organs at risk included in the target volume. In this way, the electronic device inputs the structural data of the target volume at each beam angle and the dose distribution (or the initial fluence map) of the target volume at each beam angle into the second fluence map generative model based on the denoising diffusion probabilistic model, and the fluence map with image quality comparable to the image quality of the real fluence map may be obtained, which can improve the validity of the fluence map. Then, the electronic device can generate the real and effective treatment plan according to the fluence map corresponding to each beam angle.

Considering 9-field intensity modulated radiation therapy (IMRT) for cervical cancer as an example, the fluence map generation process and the treatment plan evaluation process provided in the embodiments of the present disclosure will be described below. The fluence map generation process may include steps A to J, and the treatment plan evaluation process may include steps K to N.

In step A, the CT image of the patient is imported into the TPS, the contours of the target area and the organs at risk are delineated, and after being checked out by the doctor, the structure and contour definition of the target area and the organs at risk are approved. In step B, a treatment equipment and a treatment technology are selected.

For example, the treatment equipment may include a linear accelerator and a gamma knife (γ-knife), and the treatment technology may be step and shoot or sliding window.

In step C, a prescribed dose, number of fractions and a planned target area definition that are required for the plan are provided.

The prescribed dose required for the plan is used to indicate the amount of radiation that the patient needs to receive during the treatment process, the number of fractions is used to indicate the total number of radiotherapy treatments to be performed, and the planned target area definition may be used to indicate the target area that is selected for current treatment.

In step D, an isocenter and beam orientation are set.

In step E, according to the defined target area and the contours of the organs at risk, three-dimensional reconstruction is performed to obtain a corresponding three-dimensional structure matrix.

In step F, the CT image is normalized to construct a three-dimensional grayscale matrix, and the three-dimensional grayscale matrix and the three-dimensional structure matrix obtained in step E are superimposed on a channel dimension.

In step G, the feature obtained in step F is input into the field dose prediction network to predict the three-dimensional dose distribution at each beam angle.

In step H, according to the three-dimensional dose distribution at each beam angle obtained in step G and the corresponding beam angle, a two-dimensional dose projection feature matrix is formed by using the ray tracing algorithm to project the three-dimensional dose distribution onto the projection plane orthogonal to the beam angle.

In step I, the dose projection feature matrix determined in step H is input into the fluence map prediction network (i.e., the above-mentioned first fluence map generative model) for fluence map prediction.

In step J, the above processes are iterated to predict the fluence map corresponding to each beam angle.

In step K, the treatment plan is generated according to the fluence map corresponding to each beam angle obtained in step J.

The treatment plan includes the position information of leaves of the multi-leaf collimator, the number of monitor units in each segment at each moment, and the weight corresponding to the number of the monitor units in each segment at each moment.

In step L, the dose distribution and the DVH are generated according to the treatment plan information.

In step M, whether the dose reflected by the dose distribution and the DVH in step L is within the limit range (or satisfies the clinical standard) is determined.

In step N, if the dose reflected by the dose distribution and the DVH in step L is within the limit range, it means that the treatment plan generated in step K is qualified, and the treatment plan can be output and executed by the radiotherapy equipment.

The embodiments of the present disclosure may divide the electronic device into functional modules according to the above method examples. For example, the functional modules may be divided corresponding various functions, or two or more functions may be integrated into one processing module. The integrated module may be implemented in a form of hardware or in a form of software functional module. It will be noted that, the division of modules in the embodiments of the present disclosure is schematic, which is merely a logical function division, and there may be other division manners in actual implementation.

Figure 7:
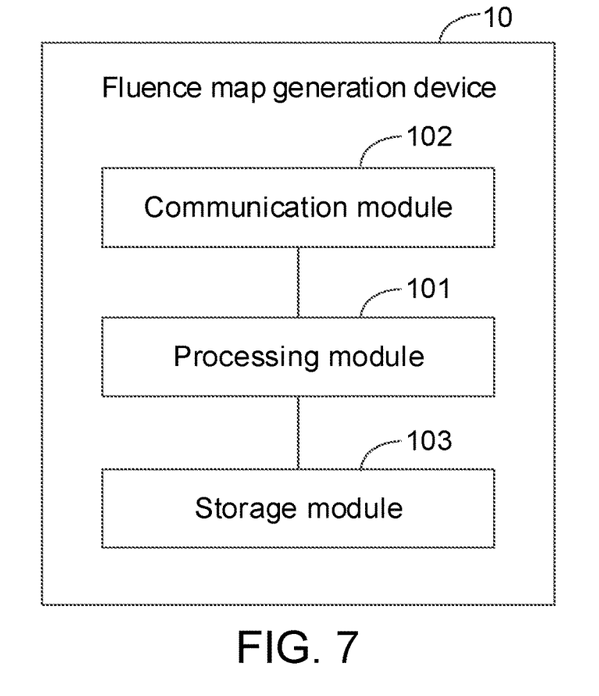
FIG. 7 is a schematic structural diagram of a fluence map generation device, in accordance with some embodiments of the present disclosure.

In a case where the integrated module is adopted, FIG. 7 shows a possible structure of the fluence map generation device involved in the above embodiments. As shown in FIG. 7, the fluence map generation device 10 may include a processing module 101 and a communication module 102. The processing module 101 may be used to control and manage the actions of the fluence map generation device 10. The communication module 102 may be used to support the communication between the fluence map generation device 10 and other entities. Optionally, as shown in FIG. 7, the fluence map generation device 10 may further include a storage module 103 used for storing program codes and data of the fluence map generation device 10.

The processing module 101 may be a processor or a controller. The communication module 102 may be a transceiver, a transceiver circuit, a communication interface, etc. The storage module 103 may be a memory.

When the processing module 101 is a processor, the communication module 102 is a transceiver, and the storage module 103 is a memory, the processor, the transceiver and the memory may be connected through a bus. The bus may be a peripheral component interconnect (PCI) bus or an extended industry standard architecture (EISA) bus. The bus may be classified into address bus, data bus, control bus, etc.

Figure 8:
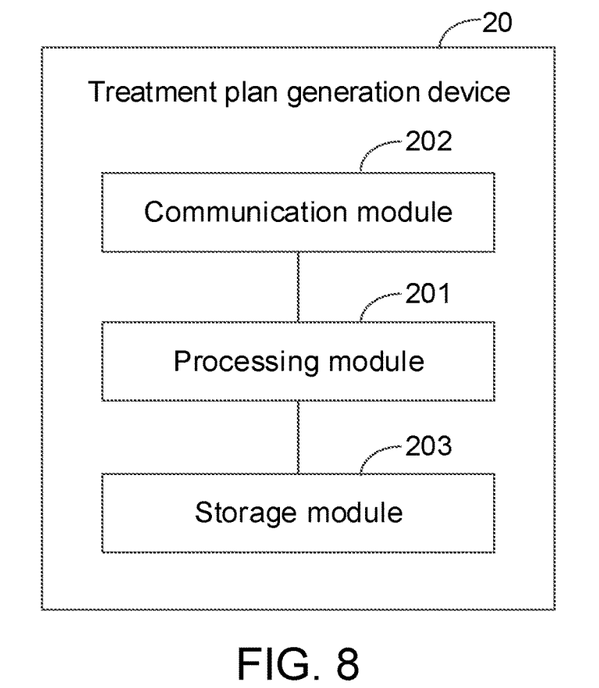
FIG. 8 is a schematic structural diagram of a treatment plan generation device, in accordance with some embodiments of the present disclosure.

FIG. 8 illustrates a possible structure of the treatment plan generation device involved in the above embodiments. As shown in FIG. 8, the treatment plan generation device 20 may include a processing module 201 and a communication module 202. The processing module 201 may be used to control and manage the actions of the treatment plan generation device 20. The communication module 202 may be used to support the communication between the treatment plan generation device 20 and other entities. In some examples, as shown in FIG. 8, the treatment plan generation device 20 may further include a storage module 203 used for storing program codes and data of the treatment plan generation device 20.

The processing module 201 may be a processor or a controller. The communication module 202 may be a transceiver, a transceiver circuit, a communication interface, etc. The storage module 203 may be a memory.

When the processing module 201 is a processor, the communication module 202 is a transceiver, and the storage module 203 is a memory, the processor, the transceiver and the memory may be connected through a bus. The bus may be a PCI bus or an EISA bus. The bus may be classified into address bus, data bus, control bus, etc.

Figure 9:
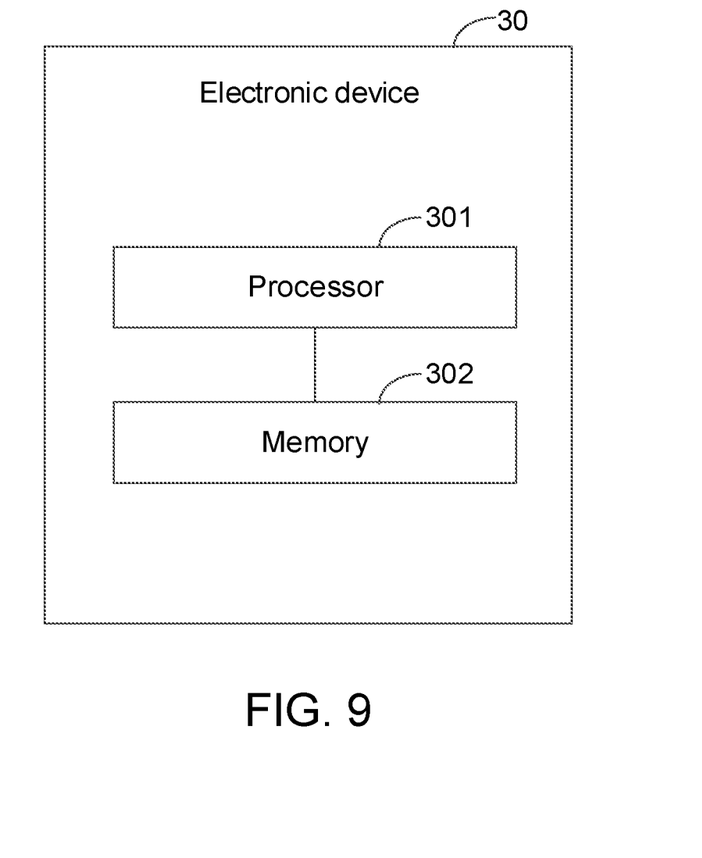
FIG. 9 is a schematic structural diagram of an electronic device, in accordance with some embodiments of the present disclosure.

Some embodiments of the present disclosure provide an electronic device. As shown in FIG. 9, the electronic device 30 includes a processor 301 and a memory 302. The memory 302 is configured to store instructions executable on the processor 301. The processor 301 is configured to execute the instructions, so that the electronic device 30 implements one or more steps of the fluence map generation method as described in the above embodiments, or implements one or more steps of the treatment plan generation method as described in the above embodiments.

In some examples, the electronic device 30 may be a computing device, such as a computer, a laptop computer, a tablet computer, or a cloud server. The electronic device 30 may further include other components, such as an input and output component, a network access component, and a bus. The processor 301 may be a central processing unit (CPU), a microprocessor, a general-purpose processor, a digital signal processor (DSP), an application specific integrated circuit (ASIC), or other programmable logic devices (e.g., a field programmable gate array (FPGA)), a discrete gate or transistor logic device, a discrete hardware component, etc. The memory 302 may include a high-speed random access memory, and may also include a non-volatile memory, such as a hard disk, a plug-in hard disk, a smart memory card (SMC), a secure digital (SD) card, a flash card, at least one disk memory, a flash memory, or other non-volatile solid-state storage devices.

Beneficial effects of the electronic device are the same as the beneficial effects of the fluence map generation method or the treatment plan generation method described in some of the above embodiments, which will not be repeated here.

Some embodiments of the present disclosure provide a non-transitory computer-readable storage medium having stored instructions. The instructions in the non-transitory computer-readable storage medium, when executed by an electronic device, cause the electronic device to perform one or more steps of the fluence map generation method as described in the above embodiments, or to perform one or more steps of the treatment plan generation method as described in the above embodiments.

For example, the non-transitory computer-readable storage medium may include, but is not limited to, a magnetic storage device (e.g., a hard disk, a floppy disk or a magnetic tape), an optical disk (e.g., a compact disk (CD) or a digital versatile disk (DVD)), a smart card and a flash memory device (e.g., an erasable programmable read-only memory (EPROM), a card, a stick or a key driver). The various computer-readable storage media described in present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. The computer program product includes computer instructions carried on a non-transitory computer-readable storage medium. The computer instructions, when run on an electronic device, cause the electronic device to perform one or more steps of the fluence map generation method as described in the above embodiments, or to perform one or more steps of the treatment plan generation method as described in the above embodiments.

Beneficial effects of the non-transitory computer-readable storage medium and the computer program product are the same as the beneficial effects of the fluence map generation method or the treatment plan generation method as described in the above embodiments, which will not be repeated here.

It should be understood that in the embodiments of the present disclosure, the sequence numbers of the above-mentioned processes do not indicate the execution order. The execution order of the processes should be determined by their functions and internal logic, and should not limit the implementation processes in the embodiments of the present disclosure.

Those skilled in the art may realize that the present disclosure may be implemented in electronic hardware or in a combination of electronic hardware and computer software with reference to modules and algorithm steps of the examples described in the embodiments disclosed herein. Whether these functions are performed by hardware or software depends on specific application and design constraints of the technical solution. Professionals may implement the described functions by using different methods on various specific applications, but such implementations should not be considered beyond the scope of the present disclosure.

Those skilled in the art can clearly understand that for the convenience and simplicity of description, the working processes of the systems, devices and modules described above may refer to the corresponding processes in the above method embodiments, and details will not be repeated here.

Some or all of the modules may be selected according to actual needs to achieve the purpose of the solutions of the embodiments.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instructions are loaded and executed on a computer, processes or functions according to the embodiments of the present application are generated in whole or in part. The computer may be a general-purpose computer, a dedicated computer, a computer network or any other programmable device. The computer instructions may be stored in a computer-readable storage medium, or may be transmitted from a computer-readable storage medium to another computer-readable storage medium. For example, the computer instructions may be transmitted from a website, computer, server or data center to another website, computer, server or data center via a wired manner (such as coaxial cable, optical fiber, or digital subscriber line (DSL)) or a wireless manner (such as infrared or microwave). The computer-readable storage medium may be any available medium that may be accessed by a computer, or a data storage device, such as a server including one or more available media, and a data center including one or more available media. The available medium may be a magnetic medium (e.g., a floppy disk, a hard disk or a magnetic tape), an optical medium (e.g., a DVD) or a semiconductor medium (e.g., a solid state drive (SSD)), or the like.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be determined by the protection scope of the claims.

What is claimed is:

1. A fluence map generation method, executed by an electronic device, comprising:
   determining radiation information of a target volume at each beam angle of a plurality of beam angles, the target volume including a target area and organs at risk; and
   inputting the radiation information of the target volume at each beam angle into a fluence map generative model based on a denoising diffusion probabilistic model to obtain a fluence map corresponding to each beam angle;
   wherein the fluence map corresponding to each beam angle is used to indicate an intensity of each beamlet corresponding to each beam angle in the target volume.

2. The fluence map generation method according to claim 1, wherein inputting the radiation information of the target volume at each beam angle into the fluence map generative model based on the denoising diffusion probabilistic model to obtain the fluence map corresponding to each beam angle includes:
   inputting a dose distribution of the target volume at each beam angle into the fluence map generative model based on the denoising diffusion probabilistic model to obtain the fluence map corresponding to each beam angle, wherein the dose distribution of the target volume at each beam angle is used to indicate a dose of radiation received by the target volume at each beam angle; or
   inputting an initial fluence map of the target volume at each beam angle into the fluence map generative model based on the denoising diffusion probabilistic model to obtain the fluence map corresponding to each beam angle, wherein the initial fluence map of the target volume at each beam angle of the plurality of beam angles is used to indicate an initial intensity of each beamlet corresponding to each beam angle in the target volume.

3. The fluence map generation method according to claim 2, wherein determining the radiation information of the target volume at each beam angle of the plurality of beam angles includes:
   determining the dose distribution of the target volume at each beam angle of the plurality of beam angles, including:
      obtaining an image and contour data of the target volume;
      inputting the image and the contour data of the target volume into a field dose prediction model to obtain a predicted three-dimensional dose distribution of the target volume at each beam angle; and
      determining the predicted three-dimensional dose distribution of the target volume at each beam angle as the dose distribution of the target volume at each beam angle.

4. The fluence map generation method according to claim 3, wherein determining the dose distribution of the target volume at each beam angle of the plurality of beam angles further includes:
   projecting the predicted three-dimensional dose distribution of the target volume at each beam angle onto a projection plane orthogonal to each beam angle to obtain the dose distribution of the target volume at each beam angle.

5. The fluence map generation method according to claim 2, wherein determining the radiation information of the target volume at each beam angle of the plurality of beam angles includes:
   determining the initial fluence map of the target volume at each beam angle of the plurality of beam angles, including:
      obtaining an image and contour data of the target volume; and
      inputting the image and the contour data of the target volume into a neural network model used for fluence map prediction, so as to obtain the initial fluence map of the target volume at each beam angle of the plurality of beam angles.

6. The fluence map generation method according to claim 1, wherein the fluence map generative model based on the denoising diffusion probabilistic model includes a first fluence map generative model or a second fluence map generative model;
   in a case where the fluence map generative model based on the denoising diffusion probabilistic model includes the first fluence map generative model, inputting the radiation information of the target volume at each beam angle into the fluence map generative model based on the denoising diffusion probabilistic model to obtain the fluence map corresponding to each beam angle includes: inputting the radiation information of the target volume at each beam angle into the first fluence map generative model to obtain the fluence map corresponding to each beam angle;
   in a case where the fluence map generative model based on the denoising diffusion probabilistic model includes the second fluence map generative model, the fluence map generation method further comprises: obtaining structural data of the target volume at each beam angle of the plurality of beam angles; and inputting the radiation information of the target volume at each beam angle into the fluence map generative model based on the denoising diffusion probabilistic model to obtain the fluence map corresponding to each beam angle includes: inputting the structural data of the target volume at each beam angle and the radiation information into the second fluence map generative model to obtain the fluence map corresponding to each beam angle.

7. A non-transitory computer-readable storage medium having stored instructions, wherein the instructions in the non-transitory computer-readable storage medium, when executed by an electronic device, cause the electronic device to execute the fluence map generation method according to claim 1.

8. A computer program product, comprising computer instructions carried on a non-transitory computer-readable storage medium, wherein the computer instructions, when run on an electronic device, cause the electronic device to perform the fluence map generation method according to claim 1.

9. A treatment plan generation method, executed by an electronic device, comprising:
obtaining an image and contour data of a target volume, where the target volume includes a target area and organs at risk;
determining radiation information of the target volume at each beam angle of a plurality of beam angles according to the image and the contour data of the target volume;
inputting the radiation information of the target volume at each beam angle into a fluence map generative model based on a denoising diffusion probabilistic model to obtain a fluence map corresponding to each beam angle, wherein the fluence map corresponding to each beam angle is used to indicate an intensity of each beamlet corresponding to each beam angle in the target volume; and
generating a treatment plan according to the fluence map corresponding to each beam angle.

10. The treatment plan generation method according to claim 9, wherein inputting the radiation information of the target volume at each beam angle into the fluence map generative model based on the denoising diffusion probabilistic model to obtain the fluence map corresponding to each beam angle includes:
inputting a dose distribution of the target volume at each beam angle into the fluence map generative model based on the denoising diffusion probabilistic model to obtain the fluence map corresponding to each beam angle, wherein the dose distribution of the target volume at each beam angle is used to indicate a dose of radiation received by the target volume at each beam angle; or
inputting an initial fluence map of the target volume at each beam angle into the fluence map generative model based on the denoising diffusion probabilistic model to obtain the fluence map corresponding to each beam angle, wherein the initial fluence map of the target volume at each beam angle of the plurality of beam angles is used to indicate an initial intensity of each beamlet corresponding to each beam angle in the target volume.

11. The treatment plan generation method according to claim 10, wherein determining the radiation information of the target volume at each beam angle of the plurality of beam angles according to the image and the contour data of the target volume includes:
determining the dose distribution of the target volume at each beam angle of the plurality of beam angles according to the image and contour data of the target volume, including:
inputting the image and contour data of the target volume into a field dose prediction model to obtain a predicted three-dimensional dose distribution of the target volume at each beam angle; and
determining the predicted three-dimensional dose distribution of the target volume at each beam angle as the dose distribution of the target volume at each beam angle.

12. The treatment plan generation method according to claim 11, wherein determining the dose distribution of the target volume at each beam angle of the plurality of beam angles according to the image and contour data of the target volume further includes:
projecting the predicted three-dimensional dose distribution of the target volume at each beam angle onto a projection plane orthogonal to each beam angle to obtain the dose distribution of the target volume at each beam angle.

13. The treatment plan generation method according to claim 10, wherein determining the radiation information of the target volume at each beam angle of the plurality of beam angles according to the image and the contour data of the target volume includes:
determining the initial fluence map of the target volume at each beam angle of the plurality of beam angles according to the image and contour data of the target volume, including:
inputting the image and the contour data of the target volume into a neural network model used for fluence map prediction to obtain the initial fluence map of the target volume at each beam angle of the plurality of beam angles.

14. The treatment plan generation method according to claim 9, wherein the fluence map generative model based on the denoising diffusion probabilistic model includes a first fluence map generative model or a second fluence map generative model;
in a case where the fluence map generative model based on the denoising diffusion probabilistic model includes the first fluence map generative model, inputting the radiation information of the target volume at each beam angle into the fluence map generative model based on the denoising diffusion probabilistic model to obtain the fluence map corresponding to each beam angle includes: inputting the radiation information of the target volume at each beam angle into the first fluence map generative model to obtain the fluence map corresponding to each beam angle;
in a case where the fluence map generative model based on the denoising diffusion probabilistic model includes the second fluence map generative model, the treatment plan generation method further comprises obtaining structural data of the target volume at each beam angle of the plurality of beam angles; and inputting the radiation information of the target volume at each beam angle into the fluence map generative model based on the denoising diffusion probabilistic model to obtain the fluence map corresponding to each beam angle includes: inputting the structural data of the target volume at each beam angle and the radiation information into the second fluence map generative model to obtain the fluence map corresponding to each beam angle.

15. An electronic device, comprising:
a processor; and
a memory configured to store instructions executable by the processor;
wherein the processor is configured to execute the instructions to cause the electronic device to implement the treatment plan generation method according to claim 9.

16. A non-transitory computer-readable storage medium having stored instructions, wherein the instructions in the non-transitory computer-readable storage medium, when executed by an electronic device, cause the electronic device to execute the treatment plan generation method according to claim 9.

17. A computer program product, comprising computer instructions carried on a non-transitory computer-readable storage medium, wherein the computer instructions, when run on an electronic device, cause the electronic device to perform the treatment plan generation method according to claim 9.

18. An electronic device, comprising:
a processor; and
a memory configured to store instructions executable by the processor;
wherein the processor is configured to execute the instructions to cause the electronic device to implement:
determining radiation information of a target volume at each beam angle of a plurality of beam angles, the target volume including a target area and organs at risk; and
inputting the radiation information of the target volume at each beam angle into a fluence map generative model based on a denoising diffusion probabilistic model to obtain a fluence map corresponding to each beam angle;
wherein the fluence map corresponding to each beam angle is used to indicate an intensity of each beamlet corresponding to each beam angle in the target volume.

19. The electronic device according to claim 18, wherein the processor is configured to execute the instructions to cause the electronic device to implement:
inputting a dose distribution of the target volume at each beam angle into the fluence map generative model based on the denoising diffusion probabilistic model to obtain the fluence map corresponding to each beam angle, wherein the dose distribution of the target volume at each beam angle is used to indicate a dose of radiation received by the target volume at each beam angle; or
inputting an initial fluence map of the target volume at each beam angle into the fluence map generative model based on the denoising diffusion probabilistic model to obtain the fluence map corresponding to each beam angle, wherein the initial fluence map of the target volume at each beam angle of the plurality of beam angles is used to indicate an initial intensity of each beamlet corresponding to each beam angle in the target volume.

20. The electronic device according to claim 19, wherein the processor is configured to execute the instructions to cause the electronic device to implement:
obtaining an image and contour data of the target volume;
inputting the image and the contour data of the target volume into a field dose prediction model to obtain a predicted three-dimensional dose distribution of the target volume at each beam angle; and
determining the predicted three-dimensional dose distribution of the target volume at each beam angle as the dose distribution of the target volume at each beam angle.

* * * * *